(12) United States Patent
Shimauchi et al.

(10) Patent No.: US 11,919,081 B2
(45) Date of Patent: Mar. 5, 2024

(54) METHOD OF MAKING SINTERED PART

(71) Applicants: SUMITOMO ELECTRIC INDUSTRIES, LTD., Osaka (JP); SUMITOMO ELECTRIC SINTERED ALLOY, LTD., Okayama (JP)

(72) Inventors: Kazunari Shimauchi, Osaka (JP); Tomoyuki Ueno, Osaka (JP); Tomoyuki Ishimine, Osaka (JP)

(73) Assignees: SUMITOMO ELECTRIC INDUSTRIES, LTD., Osaka (JP); SUMITOMO ELECTRIC SINTERED ALLOY, LTD., Okayama (JP)

( * ) Notice: Subject to any disclaimer, the term of this patent is extended or adjusted under 35 U.S.C. 154(b) by 181 days.

(21) Appl. No.: 17/310,619

(22) PCT Filed: Feb. 21, 2020

(86) PCT No.: PCT/JP2020/007219
§ 371 (c)(1),
(2) Date: Aug. 13, 2021

(87) PCT Pub. No.: WO2020/179520
PCT Pub. Date: Sep. 10, 2020

(65) Prior Publication Data
US 2022/0143696 A1 May 12, 2022

(30) Foreign Application Priority Data
Mar. 5, 2019 (JP) .................... 2019-039866

(51) Int. Cl.
*B22F 3/16* (2006.01)
*F16H 55/06* (2006.01)

(52) U.S. Cl.
CPC ............. *B22F 3/162* (2013.01); *F16H 55/06* (2013.01); *B22F 2998/10* (2013.01); *B22F 2999/00* (2013.01)

(58) Field of Classification Search
CPC ................ B22F 3/162; B22F 2003/247; B22F 2003/245; B22F 5/08; B22F 3/00; B22F 5/00; B22F 5/10
(Continued)

(56) References Cited

U.S. PATENT DOCUMENTS 3,045,557 A * 7/1962 Yamamoto .............. B23F 11/00 409/12
2004/0049919 A1* 3/2004 Puetz ...................... F16H 55/17 29/893
(Continued)

FOREIGN PATENT DOCUMENTS

| JP | 2017-186625 | 10/2017 | |
| JP | 2017186625 A | * 10/2017 | ............ B22F 1/0007 |
| WO | 2019/026783 | 2/2019 | |

*Primary Examiner* — Ricardo D Morales
(74) *Attorney, Agent, or Firm* — IPUSA, PLLC

(57) ABSTRACT

A method of making a sintered part includes a step of applying a machining process to a compacted part with a tool to make a machined compacted part having a cogwheel shape, and a step of sintering the machined compacted part to make a sintered part, wherein the machining process is such that a surface of the compacted part on a side where the tool exits is supported by a plate member having a tooth pattern with same specifications as a tooth pattern of the cogwheel shape, and the tool is used to machine portions of the compacted part corresponding to tooth spaces of the plate member.

6 Claims, 2 Drawing Sheets

(58) Field of Classification Search
USPC .................................. 29/893, 893.3, 893.34
See application file for complete search history.

(56) References Cited

U.S. PATENT DOCUMENTS

2018/0236548 A1    8/2018   Ishimine et al.
2021/0039168 A1    2/2021   Yoshida et al.

* cited by examiner

METHOD OF MAKING SINTERED PART

TECHNICAL FIELD

The disclosures herein relate to a method of making a sintered part.

The present application claims priority to Japanese application No. 2019-039866 filed on Mar. 5, 2019, and the entire contents of the Japanese application are hereby incorporated by reference.

BACKGROUND ART

Patent Document 1 discloses a method of making a sintered part which includes a step of applying a machining process to a compressed powder mass (compacted part) to make a machined compacted part having a cogwheel shape and a step of sintering the machined compacted part to make a sintered part.

RELATED-ART DOCUMENTS

Patent Document

[Patent Document 1] Japanese Laid-open Patent Publication No. 2017-186625

SUMMARY OF THE INVENTION

The disclosures herein relate to a method of making a sintered part, which includes:

- a step of applying a machining process to a first compacted part with a tool to make a machined compacted part having a cogwheel shape;
- a step of sintering the machined compacted part to make a sintered part,
- wherein the machining process is such that a surface of the first compacted part on a side where the tool exits is supported by a plate member having a tooth pattern with same specifications as a tooth pattern of the cogwheel shape, and the tool is used to machine portions of the first compacted part corresponding to tooth spaces of the plate member.

MODE FOR CARRYING OUT THE INVENTION

Figure 1:
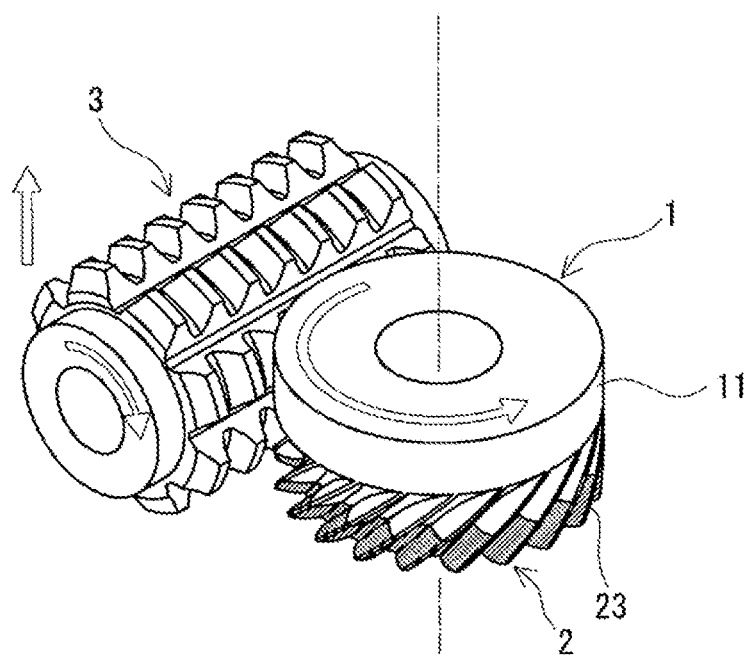
FIG. 1 is an illustrative drawing illustrating a machining process in a method of making a sintered part according to an embodiment.

Problem to be Solved by the Present Disclosures

It is desired to develop a method of making a sintered part which is suitable for an increase in mass production.

It is one of the objects of the present disclosures to provide a method of making a sintered part that excels in productivity.

Advantage of the Present Disclosures

The method of making a sintered part according to the present disclosures excels in productivity.

Description of Embodiments of the Present Disclosures

In the following, the details of embodiments of the present disclosures will be listed and described.

(1) A method of making a sintered part according to an embodiment of the present disclosures includes:

- a step of applying a machining process to a first compacted part with a tool to make a machined compacted part having a cogwheel shape; and
- a step of sintering the machined compacted part to make a sintered part,
- wherein the machining process is such that a surface of the first compacted part on a side where the tool exits is supported by a plate member having a tooth pattern with same specifications as a tooth pattern of the cogwheel shape, and the tool is used to machine portions of the first compacted part corresponding to tooth spaces of the plate member.

In general, applying a machining process to a compacted part with a tool causes tension stress at and around the surface of the compacted part on the side where the tool exits (such a surface may hereinafter be referred to as an exit surface). This tension stress functions to cut the bonds between powder particles constituting the compacted part, thereby creating a risk of generating a chip in the compacted part as a result of a machining process. The method of making a sintered part according to the present disclosures uses a plate member to support the exit surface of a compacted part, thereby providing compressive stress in the compacted part which cancels the tension stress generated by the machining process. Using the plate member to provide compressive stress in the compacted part reduces the occurrence of a chip or the like in the compacted part (machined compacted part).

The plate member has a tooth pattern with the same specifications as the tooth pattern of the cogwheel shape to be created in the compacted part. In the machining process, the tool is used to machine the portions of the compacted part corresponding to the tooth spaces of the plate member. At the portions of the compacted part corresponding to the tooth spaces of the plate member, tooth spaces will be formed that continue from the tooth spaces of the plate member as a result of machining the compacted part in conformity to the tooth spaces of the plate member. Such a machining process serves to machine the compacted part but does not machine the plate member. This is because the tool conforms to the tooth spaces of the plate member. Accordingly, supporting the compacted part with the plate member having the tooth pattern makes it possible to increase the machining speed and also to reduce the machining time. The method of making a sintered part according to the present disclosures allows a machined compacted part having a cogwheel shape to be efficiently made.

(2) As an example of the method of making a sintered part according to the present disclosures, the configuration may further include:

a step of stacking a raw material plate having no tooth pattern and a second compacted part and applying a machining process to the second compacted part together with the raw material plate to form a tooth pattern in the raw material plate, thereby making the plate member.

In the case of applying a machining process to a compacted part together with a raw material plate, a machining process applied to the compacted part (i.e., the noted second compacted part) that is first in order among a plurality of compacted parts will also machine the raw material plate at the same time. At the time of the machining process applied to the compacted part that is first in order, the raw material plate is used to support the surface of the compacted part on the side where the tool exits, and the raw material plate is shaped into the tooth pattern with the same specifications as the tooth pattern of the cogwheel shape that is formed in the compacted part. Accordingly, the plate member is efficiently obtained. The machining process applied to the compacted part (i.e., the noted first compacted part) that is the second in order utilizes the plate member obtained by the machining process applied to the compacted part that is first in order.

(3) As an example of the method of making a sintered part according to the present disclosures, the configuration may be such that the plate member has a first surface supporting the compacted part and a second surface connected to the first surface, and with the compacted part supported by the plate member, the ridge line between the first surface and the second surface is situated further out than the outer edge of the compacted part.

With the configuration noted above, the entirety of the exit surface of the compacted part is properly supported by the plate member, so that the plate member readily provides proper compressive stress in the compacted part. Especially even when the second surface is formed by chamfering a corner at the perimeter of the plate member, the plate member is capable of supporting the entirety of the exit surface of the compacted part.

(4) As an example of the method of making a sintered part according to the present disclosures in which the ridge line between the first surface and the second surface of the plate member is situated further out than the outer edge of the compacted part, the configuration may be such that the length from the outer edge of the compacted part to the ridge line is greater than or equal to 0.05 mm and less than or equal to 0.5 mm.

With the length from the outer edge of the compacted part to the ridge line being greater than or equal to 0.05 mm, the entirety of the exit surface of the compacted part is properly supported by the plate member regardless of the dimension error of the compacted part, so that the plate member readily provides proper compressive stress in the compacted part. With the length from the outer edge of the compacted part to the ridge line being less than or equal to 0.5 mm, a size increase of the plate member may be reduced.

Details of Embodiments of the Present Disclosures

In the following, the details of the embodiments of the present disclosures will be described with reference to the drawings. The present invention is not limited to those examples, and is intended to be defined by the scope of the claims and to include any variations and modifications falling within the scope warranted for equivalents of the scope of the claims. In the drawings, the same reference numbers or characters represent elements having the same names.

Method of Making Sintered Article

A method of making a sintered part according to an embodiment includes the following steps.

Machining Step: a machining process is applied to a compacted part with a tool to make a machined compacted part having a cogwheel shape.

Sintering Process: the machined compacted part is sintered to make a sintered part.

In the following, these steps will be described in detail by taking the case of making a helical gear as an example.

Machining Step

In the machining step, a machining process is applied to a compacted part with a tool to make a machined compacted part having a cogwheel shape. The method of making a sintered part according to the embodiment has one of its features in the fact that at the time of applying a machining process to a compacted part, the surface of the compacted part on the side where the tool exits is supported by a plate member having a tooth pattern with the same specifications as the tooth pattern of the cogwheel shape that is to be formed in the compacted part. Namely, when the blade of the tool moves while in contact with the compacted part to machine the compacted part, the surface that forms the ridge line with the machined surface of the compacted part is supported by the plate member at the positions where the blade of the tool moves out of the compacted part. In the following, a compacted part 1 and a plate member 2 will be described first with reference to FIG. 1 and FIG. 2, and, thereafter, the conditions of a machining process will be described.

Figure 2:
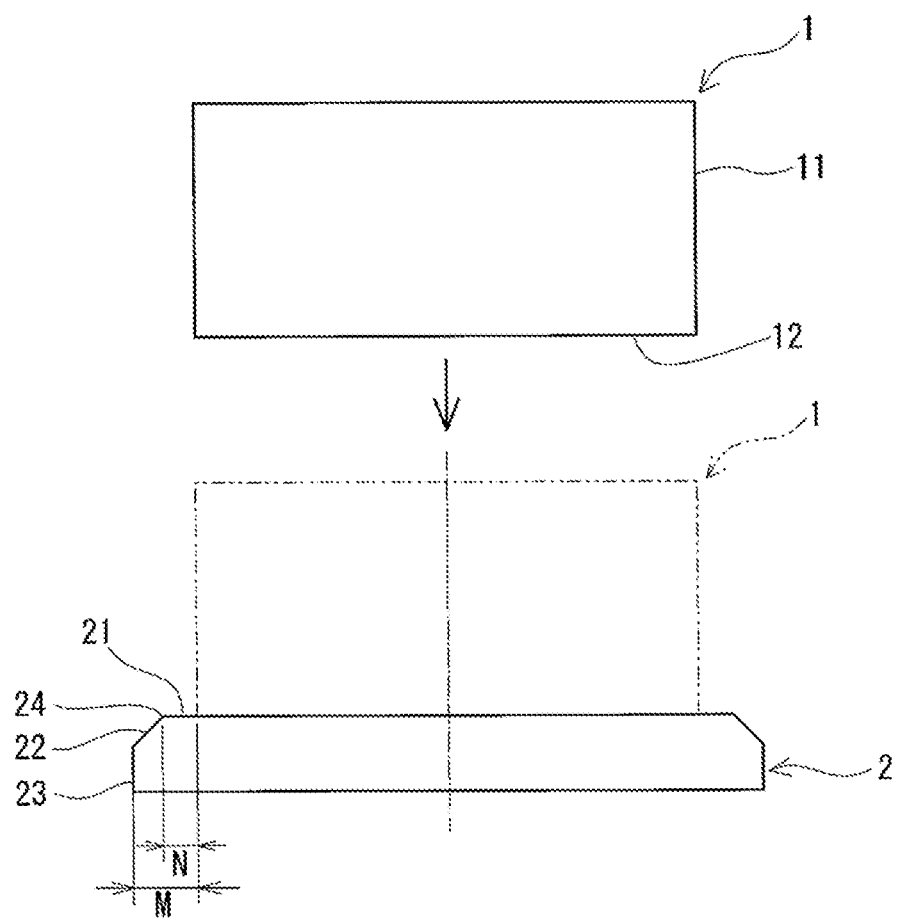
FIG. 2 is an illustrative drawing illustrating the outer dimensions of a compacted part and a plate member used in the machining process in the method of making a sintered part according to the embodiment.

FIG. 1 illustrates an ongoing machining process applied with a tool 3 to the compacted part 1 while the compacted part 1 is supported by the plate member 2. In FIG. 1, the plate member 2 is shown with hatching. The portion without hatching disposed on the plate member 2 (i.e., the entirety of the portion defined by an upper half that is an unmachined cylindrical shape and a lower half that is machined to have tooth spaces) is the compacted part 1. The open arrows illustrated in FIG. 1 indicate the directions of rotations and the direction of movement of the compacted part 1, the plate member 2, and the tool 3. FIG. 2 is a drawing illustrating the outer dimensions of the compacted part 1 and the plate member 2, in which the tooth pattern of the plate member 2 is omitted. FIG. 2 illustrates the ratio between the size of the compacted part 1 and the size of the plate member 2 in an exaggerated manner. In FIG. 2, the compacted part 1 before being supported by the plate member 2 is illustrated in solid lines, and the compacted part 1 being supported by the plate member 2 is illustrated in dash double dot lines.

Powder Compact

The compacted part 1 is produced by the compression molding of raw-material powder including metal powder. The shape of the compacted part 1 may be a circular cylinder, a hollow circular cylinder, a disk, or the like, for example. The compacted part 1 illustrated in FIG. 1 is a hollow circular cylinder.

Metal powder is a main-component material that constitutes a sintered part. The metal powder may be powder made of iron (i.e., pure iron) or an iron alloy. The iron alloy may be one which contains one or more added elements with the balance being iron (Fe) and unavoidable impurities. The content of Fe in the Fe alloy may be greater than 50 mass %, preferably greater than or equal to 80 mass %, and more preferably greater than or equal to 90 mass %. The one or more added elements may be one or more elements selected from copper (Cu), nickel (Ni), tin (Sn), chromium (Cr), molybdenum (Mo), manganese (Mn), and carbon (C), for example. These added elements contribute to the improvement of mechanical characteristics of an iron-based sintered part. The total content of Cu, Ni, Sn, Cr, Mo, and Mn among the above-noted additive elements may be greater than or equal to 0.5 mass % and less than or equal to 5.0 mass %, and more preferably greater than or equal to 1.0 mass % and less than or equal to 3.0 mass %. The content of C may be greater than or equal to 0.2 mass % and less than or equal to 2.0 mass %, and more preferably greater than or equal to 0.4 mass % and less than or equal to 1.0 mass %. The content of metal powder in the raw material powder may be greater than or equal to 90 mass %, and more preferably greater than or equal to 95 mass %. The metal powder may be made by water atomization, gas atomization, a carbonyl process, a reduction process, or the like, for example.

The average particle diameter of metal powder may be greater than or equal to 20 μm and less than or equal to 200 μm, and more preferably greater than or equal to 50 μm and less than or equal to 150 μm, for example. Use of metal powder having an average particle diameter falling within the above-noted range ensures that a compacted part is easy to handle, and compression molding is easy to perform when making a compacted part. Further, use of metal powder having an average particle diameter greater than or equal to 20 μm allows the fluidity of raw material powder to be easily obtained. Moreover, use of metal powder having an average particle diameter less than or equal to 200 μm allows a sintered part having a compact structure to be easily obtained. The average particle diameter of metal powder refers to an average diameter of particles constituting the metal powder, and refers to a particle diameter (D50) at which the cumulative volume is 50% in the particle size distribution measured by a laser diffraction particle size distribution analyzer.

The raw material powder may include an added organic binder in addition to the above-noted metal powder. The organic binder has the function to reduce the occurrence of cracks or chips in a compacted part at the time of a machining process. The organic binder may be polyethylene, polypropylene, polyolefin, polymethylmethacrylate, polystyrene, polyvinyl chloride, polyvinylidene chloride, polyamide, polyester, polyether, polyvinyl alcohol, vinyl acetate, paraffin, various waxes, or the like, for example. The organic binder may be added according to need, and may not necessarily be added.

The compacted part 1 is produced by injecting raw material powder into a mold and using a press to perform compression molding. The mold typically includes a die having through holes and a pair of upper and lower punches forming a mold space together with the inner circumferential surface of the die, the punches being inserted into the through holes for compression molding of raw material powder. In the case of molding a compacted part having a tubular shape, a rod may be utilized that is inserted through the through holes of the die. The molding pressure of compression molding may be greater than or equal to 1 GPa, preferably greater than or equal to 1.5 GPa, and more preferably greater than or equal to 2 GPa. An increase in the molding pressure serves to increase the density of the compacted part 1. The density of the compacted part 1 may be greater than or equal to 7.4 g/cm$^3$, preferably greater than or equal to 7.5 g/cm$^3$, and more preferably greater than or equal to 7.6 g/cm$^3$.

In a pressing process using a mold, a raw material powder in which metal powder and an internal lubricant are mixed may be used in order to prevent the metal powder from being stuck on the mold. A metallic soap such as lithium stearate, zinc stearate, or the like may be used as the internal lubricant. In a pressing process using a mold, further, an external lubricant may be applied to the inner circumferential surface of the mold (i.e., the inner circumferential surface of the die and also the pressing surfaces of the punches) in order to prevent the metal powder from being stuck on the mold. A metallic soap or the like such as lithium stearate, zinc stearate, or the like, for example, may be used as the external lubricant. Alternatively, a fatty acid amide such as lauric acid amide, stearic acid amide, or palmitic acid amide, or a higher fatty acid amide such as ethylene bistearic acid amide may be utilized as the external lubricant.

Plate Member

The plate member 2 is a support plate for supporting the compacted part 1 when applying a machining process to the compacted part 1. In general, applying a machining process to the compacted part 1 with the tool 3 causes tension stress at and around the surface of the compacted part 1 on the side where the tool 3 exits (which will hereinafter be referred to as an exit surface 12 (FIG. 2)). The exit surface 12 refers to the surface that forms the ridge line with the machined surface of the compacted part 1 at the positions where the blade of the tool 3 moves out of the compacted part 1 when the blade of the tool 3 moves while in contact with the compacted part 1 to machine the compacted part 1. This tension stress functions to cut the bonds between powder metal particles constituting the compacted part 1, thereby creating a risk of generating a chip in the compacted part 1 as a result of a machining process. The plate member 2 supports the exit surface 12 of the compacted part 1, thereby achieving the function to provide compressive stress in the compacted part 1 which cancels the tension stress generated by the machining process.

It suffices for the material and thickness of the plate member 2 to achieve the rigidity that is capable of providing compressive stress in the compacted part 1 which cancels the tension stress generated in the compacted part 1 by the machining process. The plate member 2 in this example is a metal plate made by a melting method. The metal plate may be made of steel.

The plate member has a first surface 21 supporting the compacted part 1 and a third surface extending in the direction that would intersect the first surface 21, as illustrated in FIG. 2. The third surface 23 has a tooth pattern formed therein (FIG. 1). The plate member 2 illustrated in FIG. 1 is a hollow circular cylinder member whose one base is the first surface 21 and whose outer circumferential surface is the third surface 23. The plate member 2 illustrated in FIG. 2 has an outer perimeter whose corner is chamfered, so that the first surface 21 and the third surface 23 are connected to each other via a second surface 22. The second surface 22 in this example is formed by 45-degree chamfering.

The tooth pattern formed in the third surface 23 has the same specifications as the tooth pattern of the cogwheel shape to be created in the compacted part 1. The tooth pattern refers to a cross-sectional shape in the plane (tooth plane) that is involved in the engagement of teeth of the cogwheel. The specifications refer to the number of teeth, a reference diameter, a module, and a pressure angle. The reference diameter is the diameter of a circle whose circumference is on the points at which the teeth are in contact with each other when cogwheels are actually engaged. The module indicates the size of teeth, and is obtained by dividing the reference diameter by the number of teeth. The pressure angle is the angle of teeth. In the case of a helical gear, the specifications a tooth pattern further includes a helix angle. The helix angle is the angle between the rotation axis of a gear and a line tangent to the tooth. This example is directed to a case in which a helical tooth pattern is formed in the compacted part 1, so that the tooth pattern formed in the third surface 23 of the plate member 2 has the number of teeth, the reference diameter, the module, the pressure angle, and the helix angle that are the same as those of the tooth pattern formed in the compacted part 1.

The outside diameter of the plate member 2 may be the same as the outside diameter of the compacted part 1. The outside diameter of the plate member 2 is the diameter of a circle whose circumference is on the tips of the teeth. In the case in which the outside diameter of the plate member 2 and the outside diameter of the compacted part 1 are the same, the corner at the perimeter of the plate member 2 is preferably not chamfered. The outside diameter of the plate member 2 may be greater than the outside diameter of the compacted part 1. In this case, the outer edge (i.e., the circle on the tooth tips) of the plate member 2 projects outwardly beyond the outer edge of the compacted part 1 when the plate member 2 supports the compacted part 1. A projection length M (FIG. 2) may be greater than or equal to 0.05 mm and less than or equal to 0.7 mm. Use of the projection length M greater than or equal to 0.05 mm allows the plate member 2 to easily support the compacted part 1 over the entire surface of the exit surface 12 regardless of the dimension error of the compacted part 1. Use of the projection length M less than or equal to 0.7 mm allows a size increase of the plate member 2 to be reduced. The projection length M is preferably greater than or equal to 0.1 mm and less than or equal to 0.6 mm, and more preferably greater than or equal to 0.15 mm and less than or equal to 0.5 mm.

In the case in which a corner at the perimeter of the plate member 2 is not chamfered, the plate member 2, when placed to support the compacted part 1, is preferably configured as illustrated in FIG. 2 such that a ridge line 24 between the first surface 21 and the second surface 22 is situated further out than the outer edge of the compacted part 1. In this case, the outside diameter of the plate member 2 is greater than the outside diameter of the compacted part 1. The tooth pattern formed in the third surface 23 has the same root-circle diameter as, and a greater outside-circle diameter and tooth height than, the tooth pattern to be formed in the compacted part 1. A length N (FIG. 2) from the outer edge of the compacted part 1 to the above-noted ridge line 24 may be greater than or equal to 0.05 mm and less than or equal to 0.5 mm. Use of the length N greater than or equal to 0.05 mm allows the plate member 2 to support the entirety of the exit surface 12 of the compacted part 1 even when a corner of the plate member 2 is chamfered. Use of the length N less than or equal to 0.5 mm allows a size increase of the plate member 2 to be reduced. The length N is preferably greater than or equal to 0.05 mm and less than or equal to 0.3 mm, and more preferably greater than or equal to 0.1 mm and less than or equal to 0.2 mm.

The plate member 2 may be such that a corner at the perimeter is not chamfered, and such that the first surface 21 and the third surface 23 are directly connected to each other at the ridge line, without having the second surface 22 intervening therebetween. In this case, the outside diameter of the plate member 2 may be the same as, or greater than, the outside diameter of the compacted part 1. In the case in which the outside diameter of the plate member 2 and the outside diameter of the compacted part 1 are the same, the tooth pattern formed in the third surface 23 has the same root-circle diameter, outside-circle diameter, and tooth height as the tooth pattern to be formed in the compacted part 1. In the case in which the outside diameter of the plate member 2 is greater than the outside diameter of the compacted part 1, the tooth pattern formed in the third surface 23 has the same root-circle diameter as, and a greater outside-circle diameter and tooth height than, the tooth pattern to be formed in the compacted part 1. Even when a corner at the perimeter of the plate member 2 is not chamfered, the ridge line between the first surface 21 and the third surface 23 is preferably situated further out than the outer edge of the compacted part 1. Such an arrangement allows the plate member 2 to support the compacted part 1 over the entire surface of the exit surface 12 regardless of the dimension error of the compacted part 1.

The plate member 2 is obtained by stacking a raw material plate having no tooth pattern (e.g., the plate member 2 illustrated in FIG. 2 before being machined to have a tooth pattern) and the compacted part 1 and by applying a machining process to the compacted part 1 together with the raw material plate, for example. Specific shapes of the raw material plate may include a disc shape. In this case, at the time of applying a machining process to the compacted part 1 that is first in order among a plurality of compacted parts 1, the machining process is also applied to the raw material plate, thereby making the plate member 2. Namely, at the time of the machining process applied to the compacted part 1 that is first in order, the raw material plate is used to support the exit surface 12 of the compacted part 1, and the raw material plate is shaped into the tooth pattern with the same specifications as the tooth pattern formed in the compacted part 1. The raw material plate having the tooth pattern formed therein will serve as the plate member 2. The machining process applied to the compacted part 1 that is second or subsequent in order utilizes the plate member 2 obtained by the machining process applied to the compacted part 1 that is first in order. It may be noted that, when forming a tooth pattern in the raw material plate together with the compacted part 1, the machining speed drops compared with when forming a tooth pattern only in the compacted part 1, due to the fact that the raw material plate is made of a metal plate. In other words, use of the plate member 2 having the tooth pattern formed therein allows the machining speed to increase, compared with when using a plate member having no tooth pattern formed therein, because only the compacted part 1 is subjected to the machining, without having plate member 2 subjected to the machining. Once the plate member 2 having the tooth pattern formed therein is made, such a plate member 2 does not have to be replaced each time a cogwheel shape is formed in the compacted part 1. As the plate member 2, a metal plate may alternatively be prepared that has the third surface 23 shaped into a tooth pattern with the same specifications as the tooth pattern of the compacted part 1, independently of the process that makes the tooth pattern in the compacted part 1.

Conditions of Machining Process

The machining process is mainly a cutting process, in which the tool 3 for cutting is used to form a cogwheel shape into the compacted part 1. The machining process for forming a cogwheel shape may utilize a hob, a broach, a pinion cutter, or the like. In the machining process, the surface (i.e., the exit surface 12 in FIG. 2) of the compacted part 1 on the side where the tool 3 exits is supported by the plate member 2 having a tooth pattern with the same specifications as the tooth pattern of the cogwheel shape that is to be formed in the compacted part 1.

The aspect of the machining process will be described with reference to FIG. 1. FIG. 1 illustrates an example in which a hob cutter is used as the tool 3 to form a helical gear shape in the compacted part 1. The hob cutter has a plurality of blades on the outer circumferential surface of the cylindrical body. The hob cutter is arranged such that its axial direction is perpendicular to the axial direction of the compacted part 1. Starting from that state, the hob cutter moves in the axial direction of the compacted part while rotating. In this example, the hob cutter rotates (spins) while moving from the lower side to the upper side of the sheet, such that the blades cut into an outer circumferential surface 11 of the compacted part 1 from the upper side of the sheet. Further, the compacted part 1 rotates in conformity to the direction in which the blades of the hob cutter advances. In this example, the compacted part 1 rotates (spins) counterclockwise as viewed from above in FIG. 2. In the case of such a hob cutter movement, the blades of the hob cutter exit from the outer circumferential surface 11 of the compacted part 1 toward the surface on the lower side of the sheet (i.e., the exit surface 12 in FIG. 2). Accordingly, the plate member 2 is used to support the exit surface 12 as tension stress is generated at and around the exit surface 12 of the compacted part 1. The plate member 2 rotates (spins) in the same manner as the compacted part 1. In the machining process, the tool 3 is used to machine the portions of the compacted part 1 corresponding to the tooth spaces of the plate member 2. At the portions of the compacted part 1 corresponding to the tooth spaces of the plate member 2, tooth spaces will be formed that continue from the tooth spaces of the plate member 2 as a result of machining the compacted part 1 in conformity to the tooth spaces of the plate member 2. The shape in which both tooth spaces are continuous to each other is realized by properly setting the rotation of the tool 3, the rotation of the compacted part 1 and the plate member 2, and the start position at which the tool 3 starts machining the compacted part 1. Specifically, the start position at which the tool 3 starts machining the compacted part 1 is such that the blades of the hob cutter are aligned with the tooth spaces of the plate member 2. The compacted part 1 and the plate member 2 are then rotated in synchronization with the rotation of the hob cutter.

Sintering Step

In the sintering step, a machined compacted part obtained by applying the machining process to a compacted part is sintered. Sintering a compacted part causes a sintered part to be obtained by bonding the particles of metal powder in contact with each other. In sintering a compacted part, known conditions may be applied in accordance with the composition of metal powder. For example, for the metal powder that is iron powder or iron alloy powder, the sintering temperature may be greater than or equal to 1000° C. and less than or equal to 1400° C., and preferably greater than or equal to 1100° C. and less than or equal to 1300° C. The sintering time may be greater than or equal to 15 minutes and less than or equal to 150 minutes, and preferably greater than or equal to 20 minutes and less than or equal to 60 minutes.

The extent of machining during the machining process may be adjusted based on differences between the actual dimensions and the designed dimensions of a sintered part. A machined compacted part obtained by machining a high-density compacted part shrinks almost evenly upon sintering. The extent of machining during the machining process may be adjusted based on differences between actual sintered dimensions and designed dimensions, thereby making it possible to bring the actual dimensions of a sintered part close to the designed dimensions. As a result, the labor and time required for a subsequent finish machining can be reduced.

Finishing Step

In the finishing process, a grinding process or the like is applied to the surface of a sintered part to reduce the surface roughness of the sintered part and also to make the dimensions of the sintered part match with the designed dimensions.

Effect

The method of making a sintered part according to the embodiment can reduce the occurrence of a chip and the like in a machined compacted part. This is because the surface (the exit surface 12 in FIG. 2) of the compacted part 1 on the side where the tool 3 exits is supported by the plate member 2 during a machining process to cause the plate member 2 to provide compressive stress in the compacted part 1. In particular, the ridge line 24 between the first surface 21 of the plate member 2 supporting the compacted part 1 and the second surface 22 connected to the first surface 21 is situated further out than the outer edge of the compacted part 1, so that the entirety of the exit surface 12 of the compacted part 1 is easily supported by the plate member 2, and the plate member 2 easily provides proper compressive stress in the compacted part 1.

The method of making a sintered part according to the embodiment allows a machined compacted part having a cogwheel shape to be efficiently made. This is because the plate member 2 has a tooth pattern with the same specifications as the tooth pattern of the cogwheel shape to be formed in the compacted part 1, and the tool 3 is used machine the portions of the compacted part 1 corresponding to the tooth spaces of the plate member 2 during the machining process. With the tool 3 being fit into the tooth spaces of the plate member 2, the plate member 2 is not subjected to machining while the compacted part 1 is subjected to machining. The machining speed can thus be increased, and the machining time can be reduced.

Test Example

A machining process is applied to a compacted part with a tool to make a machined compacted part having a cogwheel shape, followed by inspecting chipping in the machined compacted part.

Test Example 1

In Text Example 1, conditions set forth in the following for a test A and a test B were used to make 1000 machined compacted parts for each, followed by inspecting chipping in the machined compacted parts.

Test A

A cylindrical compacted part with an outer diameter of 45 mm, an inner diameter of 20 mm, and a height of 20 mm was prepared. The coaxiality of the inner and outer diameters of the compacted part was less than or equal to 0.01. The density of the compacted part was 7.71 g/cm$^3$. Further, a cylindrical plate member with an outer diameter of 45 mm, an inner diameter of 20 mm, and a height of 5 mm was prepared. The plate member was a steel plate made by a melting method. The outer circumferential surface of the plate member had a tooth pattern with the same specifications as the tooth pattern of the cogwheel shape to be created in the compacted part. This plate member having the tooth pattern was made at the time of applying a mechanical process to a compacted part that is first in order, by stacking the compacted part and a raw material plate having no tooth pattern and then applying a machining process to the compacted part together with the raw material plate to form the tooth pattern in the raw material plate. The tooth pattern specifications were such that the number of teeth was 29, the module being 1.4, the pressure angle being 17.5 degrees, and the helix angle being 15.8 degrees. When a machining process was applied to a compacted part that was second or subsequent in order, the plate member obtained at the time of applying a machining process to the compacted part that was first in order was used to support the surface of the compacted part on the side where the tool exited, and the tool was used to machine the portions of the compacted part corresponding to the tooth spaces of the plate member. With respect to test samples A, the plate member was not replaced when machining the second and subsequent compacted parts. The tooth pattern specifications of the cogwheel shape formed in a compacted part were such that the number of teeth was 29, the module being 1.4, the pressure angle being 17.5 degrees, and the helix angle being 15.8 degrees. The machining speed of a machining process was 0.8 mm/rev for the machining of a compacted part that was first in order, and was 4.0 mm/rev for the machining of a compacted part that was second or subsequent in order.

In Test A, the outer diameter of a compacted part was the same as the outer diameter of the plate member. Accordingly, with the compacted part being supported by the plate member, the projection length of the plate member projecting beyond the outer edge of the compacted part (see the length M in FIG. 2, which will hereinafter be referred to as a maximum projection length) was 0 mm. In test A, a corner at the perimeter of the plate member was not chamfered. Namely, the surface supporting the compacted part and the outer circumferential surface on which the tooth pattern was formed were directly connected to each other at the ridge line. Accordingly, with the compacted part being supported by the plate member, the length from the outer edge of the compacted part to the outer edge (the above-noted ridge line) of the plate member (see the length N in FIG. 2, which will hereinafter be referred to as a ridge line projecting length) was also 0 mm.

Test B

The compacted part as noted above and the plate member having no tooth pattern were prepared. The plate member was a steel plate made by a melting method and having a cylindrical shape with an outer diameter of 45 mm, an inner diameter of 20 mm, and a height of 5 mm. The plate member supported the surface of the compacted part on the side where the tool exited, and the tool was used to machine the compacted part. In Test B, a plate member having no tooth pattern was used as a replacement each time a cogwheel shape was formed with respect to a compacted part. Accordingly, Test B was such that a tooth pattern was formed in the plate member each time a tooth pattern was formed with respect to a compacted part. The tooth pattern specifications of the cogwheel shape formed in a compacted part were such that the number of teeth was 29, the module being 1.4, the pressure angle being 17.5 degrees, and the helix angle being 15.8 degrees. The machining speed of a machining process was 0.8 mm/rev.

In Test B, the outer diameter of a compacted part was the same as the outer diameter of the plate member having no tooth pattern. Accordingly, with the compacted part being supported by the plate member having no tooth pattern, the maximum projection length of the plate member was 0 mm. In Test B, a corner at the perimeter of the plate member having no tooth pattern was not chamfered. Accordingly, with the compacted part being supported by the plate member having no tooth pattern, the ridge line projecting length of the plate member was 0 mm.

Machinability

In Test A in which a machining process was applied to a compacted part supported by a plate member having a tooth pattern, chipping failure was 1.5%. In Test A, there was no need to replace the plate member each time a cogwheel shape was formed with respect to a compacted part, and the actual machining time per compacted part was 4.5 seconds. Further, Test A confirmed that the plate member did not exhibit a change in its shape even after making 1000 machined compacted parts, and was able to be used repeatedly. In Test B, chipping failure was about the same as in Test A. In Test B, however, a plate member having no tooth pattern was used as a replacement each time a cogwheel shape was formed with respect to a compacted part, and the actual machining time per compacted part was 10.3 seconds. Namely, the actual machining time in Test A was successfully reduced by a significant margin, compared with Test B. In Test A, further, the machining speed was successfully set to be 5 times faster than the machining time in Test B, thereby allowing the application of a high-speed machining process. Based on these observations also, the actual machining time was successfully reduced in Test A by a significant margin, compared with Test B. it was thus confirmed that applying a machining process to a compacted part supported by a plate member having a tooth pattern makes it possible to reduce the occurrence of chipping caused by the machining process, and also excels in productivity.

Test Example 2

In Text Example 2, the size of a plate member was changed from that of Test A to make 1000 machined compacted parts for each test (i.e., Test C, Test D, and Test E), followed by inspecting chipping in the machined compacted parts. The size and shape of a compacted part as well as the conditions of a machining process were the same as in Test A.

Test C

A plate member was prepared by 45-degree chamfering on a corner at the perimeter of the plate member used in Test A. The width of a 45-degree chamfer was 0.1 mm. A machining process was applied to a compacted part supported by this 45-degree-chamfered plate member. In Test C, the outer diameter of a compacted part was the same as the outer diameter of the plate member. Accordingly, with the compacted part being supported by the plate member, the maximum projection length of the plate member was 0 mm. It may be noted that, in test C, a corner at the perimeter of the plate member was 45-degree chamfered. Namely, the surface (i.e., the support surface) supporting a compacted part and the outer circumferential surface on which the tooth pattern was formed were connected to each other via the face (i.e., the chamfer) that was formed by 45-degree chamfering. With a compacted part supported by the plate member, therefore, the ridge line that is situated between the chamfer and the support surface and that defines the perimeter at the corner of the plate member is positioned further in than the outer edge of the compacted part in the radial direction. This results in the ridge line projecting length of the plate member being a negative value.

Test D

A cylindrical plate member with an outer diameter of 45.2 mm, an inner diameter of 20 mm, and a height of 5 mm was prepared. A machining process was applied to a compacted part supported by this plate member. In Test D, the outer diameter of the plate member was greater than the outer diameter of a compacted part. With the compacted part being supported by the plate member, the maximum projection length of the plate member was 0.1 mm. In test D, a corner at the perimeter of the plate member was not chamfered. Accordingly, with the compacted part being supported by the plate member, the ridge line projecting length of the plate member was also 0.1 mm.

Test E

A cylindrical plate member with an outer diameter of 45.4 mm, an inner diameter of 20 mm, and a height of 5 mm was prepared. A machining process was applied to a compacted part supported by this plate member. In Test E, the outer diameter of the plate member was greater than the outer diameter of a compacted part. With the compacted part being supported by the plate member, the maximum projection length of the plate member was 0.2 mm. In test E, a corner at the perimeter of the plate member was not chamfered. Accordingly, with the compacted part being supported by the plate member, the ridge line projecting length of the plate member was also 0.2 mm.

Machinability

The results were such that chipping failure occurred in 6.5% in Test C. This is believed to be because the fact that a corner at outer perimeter of the plate member was chamfered caused the chamfered portion to fail to support the exit surface of a compacted part, despite the fact that the outer diameter of the plate member is the same as the outer diameter of the compacted part. It may be noted that Test A had chipping failure that was 1.5% as previously described, so that chipping failure was successfully reduced, compared with Test C. This is because, with a compacted part being supported by the plate member, the maximum projection length and ridge line projecting length of the plate member were 0 mm. In other words, substantially the entirety of the exit surface of a compacted part was supported by the plate member, which was believed to be the reason. In Test D, chipping failure was 0.12%, so that chipping failure was confirmed to be further reduced, compared with Test A. This is because, with a compacted part being supported by the plate member, the ridge line projecting length of the plate member was a positive value. In other words, this is believed to be because the entirety of the exit surface of a compacted part was supported by the plate member in a more reliable manner even when factoring in tolerance in each member. In Test D, chipping failure was 0.06%, so that chipping failure was confirmed to be further reduced, compared with Test D. This is because, with a compacted part being supported by the plate member, the ridge line projecting length of the plate member was a positive value greater than that of Test D. In other words, this is believed to be because the entirety of the exit surface of a compacted part was supported by the plate member in a more reliable manner even when factoring in tolerance, and error caused by rotation, in each member.

DESCRIPTION OF REFERENCE SYMBOLS 1 compacted part
11 outer circumferential surface
12 exit surface
2 plate member
21 first surface
22 second surface
23 third surface
24 ridge line
3 tool

The invention claimed is:

1. A method of making a sintered part, comprising:
    a step of applying a machining process to a first compacted part with a tool to make a machined compacted part having a cogwheel shape; and
    a step of sintering, the machined compacted part to make a sintered part,
    wherein the machining process is such that a surface of the first compacted part on a side where the tool, exits is supported by a plate member having a tooth pattern with same specifications as a tooth pattern of the cogwheel shape, and a blade of the tool moves through spaces between teeth of the plate member immediately upon cutting through the first compacted part.

2. The method of making a sintered part as claimed in claim 1, further comprising a step of stacking a raw material plate having no tooth pattern and a second compacted part and applying a machining process to the second compacted part together with the raw material plate to form a tooth pattern in the raw material plate, thereby making the plate member.

3. The method of making a sintered part as claimed in claim 1, wherein the plate member has a first surface supporting the first compacted part and a second surface connected to the first surface, and
    with, the first compacted part supported by the plate member, a ridge line between the first surface and the second surface is situated further out than an outer edge of the first compacted part.

4. The method of making a sintered part as claimed in claim 3, wherein a length from the outer edge of the first compacted part to the ridge line is greater than or equal to 0.05 mm and less than or equal to 0.5 mm.

5. The method of making a sintered part as claimed in claim 2, wherein the plate member has a first surface supporting the first compacted part and a second surface connected to the first surface, and with the first compacted part supported by the plate member, a ridge line between the first surface and the second surface is situated further out than an outer edge of the compacted part.

6. The method of making a sintered part as claimed in claim 5, wherein a length from the outer edge of the compacted part to the ridge line is greater than or equal to 0.05 mm and less than or equal to 0.5 mm.

* * * * *